(12) United States Patent
Jeong et al.

(10) Patent No.: US 9,832,477 B2
(45) Date of Patent: Nov. 28, 2017

(54) DATA ENCODING WITH SIGN DATA HIDING

(71) Applicant: Samsung Electronics Co., Ltd., Suwon-si (KR)

(72) Inventors: Yo Won Jeong, Yongin-si (KR); Nyeong Kyu Kwon, Daejeon (KR); Yo Han Lim, Yongin-si (KR); Young Beom Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 328 days.

(21) Appl. No.: 14/518,152

(22) Filed: Oct. 20, 2014

(65) Prior Publication Data

US 2015/0120798 A1   Apr. 30, 2015

(30) Foreign Application Priority Data

Oct. 28, 2013  (KR) .................. 10-2013-0128507

(51) Int. Cl.
*H04N 19/48*   (2014.01)
*H04N 19/61*   (2014.01)

(52) U.S. Cl.
CPC ............. *H04N 19/48* (2014.11); *H04N 19/61* (2014.11)

(58) Field of Classification Search
CPC ................................. H04N 7/30; H04N 19/48
See application file for complete search history.

(56) References Cited

U.S. PATENT DOCUMENTS

| 8,311,119 | B2 | 11/2012 | Srinivasan |
| 2012/0082235 | A1 | 4/2012 | Lou et al. |
| 2012/0140822 | A1 | 6/2012 | Wang et al. |
| 2012/0155781 | A1 | 6/2012 | Onoue |
| 2012/0287989 | A1 | 11/2012 | Budagavi et al. |
| 2013/0003857 | A1 | 1/2013 | Yu et al. |
| 2013/0022115 | A1 | 1/2013 | Oh |
| 2013/0128985 | A1* | 5/2013 | He ................ H04N 19/176 375/240.18 |
| 2013/0215964 | A1 | 8/2013 | Yang et al. |
| 2014/0133574 | A1* | 5/2014 | Lee ................ H04N 19/70 375/240.18 |

FOREIGN PATENT DOCUMENTS

| JP | 2008199616 | 8/2008 |
| KR | 2013050897 | 5/2013 |
| KR | 2013062995 | 6/2013 |

* cited by examiner

*Primary Examiner* — Matthew Sandifer
(74) *Attorney, Agent, or Firm* — Onello & Mello LLP

(57) ABSTRACT

A method of encoding data includes selecting a line to define an adjustment target coefficient group in each of a plurality of coefficient groups included in a transform unit that has been transformed and quantized. Each of the coefficient groups comprises a plurality of coefficients. For each of the coefficient groups, a sum of the coefficients for the respective coefficient group is calculated. For each of the coefficient groups, a value of one adjustment target coefficient included in the adjustment target coefficient group is adjusted according to a result of the calculation of the sum of the coefficients for the respective coefficient group.

19 Claims, 18 Drawing Sheets

[CASE1]  [0 0 8 2 0 5 -7 4 3 1 6 -2 1 -1 0 0] → Sum=40 (Even)
[CASE2]  [0 0 8 2 0 5 -7 4 3 1 5 -2 1 -1 0 0] → Sum=39 (Odd) → Level Adjustment
         |←——— Searching Adjustment Target ———→|

☒ : Adjustment Target Coefficient Group1(ATCG1)

▨ : Adjustment Target Coefficient Group2(ATCG2)

DATA ENCODING WITH SIGN DATA HIDING

CROSS-REFERENCE TO RELATED APPLICATIONS

This application claims priority under 35 U.S.C. §119(a) from Korean Patent Application No. 10-2013-0128507 filed on Oct. 28, 2013, the disclosure of which is hereby incorporated by reference in its entirety.

BACKGROUND

Embodiments of the inventive concept relate to an encoder. In particular, the inventive concepts relate to an encoder that uses sign data hiding to enable the adjustment of a value of a coefficient included in an adjustment target coefficient group, defined in each coefficient group.

When image data is encoded, the image data can be compressed by removing spatial redundancy or temporal redundancy from the image data. A spatial transform may be performed in order to remove the spatial redundancy. Predicative coding may be performed using a frame preceding a currently encoded frame and/or a frame succeeding the currently encoded frame to remove the temporal redundancy. Apart from the approach for removing the spatial or temporal redundancy from the image data, other various approaches for compressing the image data have been developed.

SUMMARY

Embodiments of the inventive concept provide for a method of encoding data using sign data hiding.

In one aspect, a method of encoding data comprises selecting a line to define an adjustment target coefficient group in each of a plurality of coefficient groups included in a transform unit that has been transformed and quantized. Each of the coefficient groups comprise a plurality of coefficients. For each of the coefficient groups, a sum of the coefficients for the respective coefficient group is calculated. For each of the coefficient groups, a value of one adjustment target coefficient included in the adjustment target coefficient group is adjusted according to a result of the calculation of the sum of the coefficients for the respective coefficient group.

In some embodiments, the line is a column at a same position amongst a plurality of columns in each of the coefficient groups.

In some embodiments, the column is one of a rightmost or a leftmost column.

In some embodiments, the line is a row at a same position amongst a plurality of rows in each of the coefficient groups.

In some embodiments, the row is one of a topmost or a bottommost row.

In some embodiments, adjusting the value of one of the adjustment target coefficients comprises increasing or decreasing the value by one when the sum of the coefficients is an even number and a sign of a first non-zero coefficient is a minus sign, or when the sum of the coefficient is an odd number and the sign of the first non-zero coefficient is a plus sign.

In some embodiments, adjusting the value of one of the adjustment target coefficients is performed without scanning for a last non-zero coefficient comprised in the transform unit.

In some embodiments, selecting a line further comprises selecting at least one second line to define the adjustment target coefficient group in each of the coefficient groups.

In some embodiments, selecting the line is based on at least one mode selection signal.

In some embodiments, the mode selection signals comprise attribute information of the transform unit, coding mode information of the transform unit, or size information of the transform unit.

In some embodiments, the attribute information comprises at least one of a luma component and a chroma component.

In some embodiments, the coding mode information comprises information about one of an inter coding mode and an intra coding mode.

In another aspect, an encoder comprises a forward transform and quantization (FTQ) block configured to transform and quantize a transform unit and a sign data hiding block configured to select a line to define an adjustment target coefficient group in each of a plurality of coefficient groups comprised in the transform unit of coefficients. The sign data hiding block is further configured to calculate a sum of the coefficients comprised in each of the coefficient groups, and for each of the coefficient groups to adjust a value of one adjustment target coefficient comprised in the adjustment target coefficient group according to a result of the calculation of the sum of the coefficients for the respective coefficient group.

In some embodiments, the line is a column at a same position in the coefficient groups amongst a plurality of columns in each of the coefficient groups.

In some embodiments, the column is one of a rightmost or a leftmost column.

In some embodiments, the line is a row at a same position amongst a plurality of rows in each of the coefficient groups.

In some embodiments, the row is one of a topmost or a bottommost row.

In some embodiments, the sign data hiding block increases or decreases the value of one of the adjustment target coefficients by one when the sum of the coefficients is an even number and a sign of a first non-zero coefficient has a minus sign, or when the sum of the coefficient is an odd number and the sign of the first non-zero coefficient has a plus sign.

In some embodiments, the sign data hiding block comprises a sign data hiding mode selector configured to select a sign data hiding mode based on at least one mode selection signal, a plurality of sub sign data hiding blocks each configured to select, for each of the coefficient groups, one adjustment target coefficient comprised in the adjustment target coefficient group corresponding to the selected sign data hiding mode and to adjust the value of the selected adjustment target coefficient, and an output selector configured to output one output of the sub sign data hiding blocks based on at least one mode selection signal.

In some embodiments, the mode selection signals comprise attribute information of the transform unit, coding mode information of the transform unit, and size information of the transform unit. The attribute information comprises at least one of a luma component and a chroma component. The coding mode information comprises information about one of an inter coding mode and an intra coding mode.

In another aspect, a system on chip (SoC) comprises a multimedia interface configured to interface frame data received from a multimedia device and an encoder configured to encode the frame data. The encoder comprises a forward transform and quantization (FTQ) block configured to transform and quantize a transform unit, and a sign data hiding block configured to select a line to define an adjustment target coefficient group in each of a plurality of coefficient groups comprised in the transform unit that has been transformed and quantized. Each of the coefficient groups comprise a plurality of coefficients. The sign data hiding block is further configured to calculate a sum of the coefficients comprised in each of the coefficient groups, and for each of the coefficient groups, to adjust a value of one adjustment target coefficient comprised in the adjustment target coefficient group according to a result of the calculation of the sum of the coefficients for the respective coefficient group.

In some embodiments, the line is a column at a same position in the coefficient groups amongst a plurality of columns comprised in each of the coefficient groups, or a row at the same position in the coefficient groups amongst a plurality of rows comprised in each of the coefficient groups.

In some embodiments, the sign data hiding block increases or decreases the value of one of the adjustment target coefficients by one when the sum of the coefficients is an even number and a sign of a first non-zero coefficient has a minus sign, or when the sum of the coefficient is an odd number and the sign of the first non-zero coefficient has a plus sign.

In another aspect, a data processing system comprises a multimedia interface configured to interface frame data received from a multimedia device, an encoder configured to encode the frame data, and a memory configured to store the frame data that has been encoded by the encoder. The encoder comprises a forward transform and quantization (FTQ) block configured to transform and quantize a transform unit, and a sign data hiding block configured to select a line to define an adjustment target coefficient group in each of a plurality of coefficient groups comprised in the transform unit that has been transformed and quantized. Each of the coefficient groups comprises a plurality of coefficients. The sign data hiding block is further configured to calculate a sum of the coefficients comprised in each of the coefficient groups, and for each of the coefficient groups, to adjust a value of one of adjustment target coefficients comprised in the adjustment target coefficient group according to a result of the calculation of the sum of the coefficients for the respective coefficient group.

In some embodiments, the line is a column at a same position in the coefficient groups amongst a plurality of columns comprised in each of the coefficient groups, or a row at the same position in the coefficient groups amongst a plurality of rows comprised in each of the coefficient groups, and the sign data hiding block adjusts the value of one of the adjustment target coefficients without scanning for a last non-zero coefficient comprised in the transform unit.

In another aspect, a data encoding system comprises a forward transform and quantization (FTQ) block configured to transform and quantize a transform unit, and a sign data hiding block configured to define an adjustment target coefficient group in each of a plurality of coefficient groups comprised in the transform unit. The transform unit is received by the FTQ block. The sign data hiding block comprises a sign data hiding mode selector configured to select a sign data hiding mode based on at least one mode selection signal.

In some embodiments, the sign data hiding block further comprises a plurality of sub sign data hiding blocks each configured to select, for each of the coefficient groups, one adjustment target coefficient comprised in the adjustment target coefficient group corresponding to the selected sign data hiding mode and to adjust the value of the selected adjustment target coefficient, and an output selector configured to output one output of the sub sign data hiding blocks based on at least one mode selection signal.

In some embodiments, the selection mode is determined by at least one of an attribute information of the transform unit, a coding mode of the transform unit and a size information of the transform unit.

In some embodiments, the data encoding system further comprises an Inverse Quantization and Transform (IQT) block in electrical communication with the FTQ block and the sign data hiding block.

In some embodiments, each of the coefficient groups comprise a plurality of coefficients. The coefficients of each coefficient group not included in the respective adjustment target coefficient group are transmitted from the FTQ block to the IQT block to be processed by the FTQ block substantially in parallel with an adjustment by the sign data handling block of a value of one adjustment target coefficient comprised in the adjustment target coefficient group of the same coefficient group.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF THE EMBODIMENTS

Figure 1:
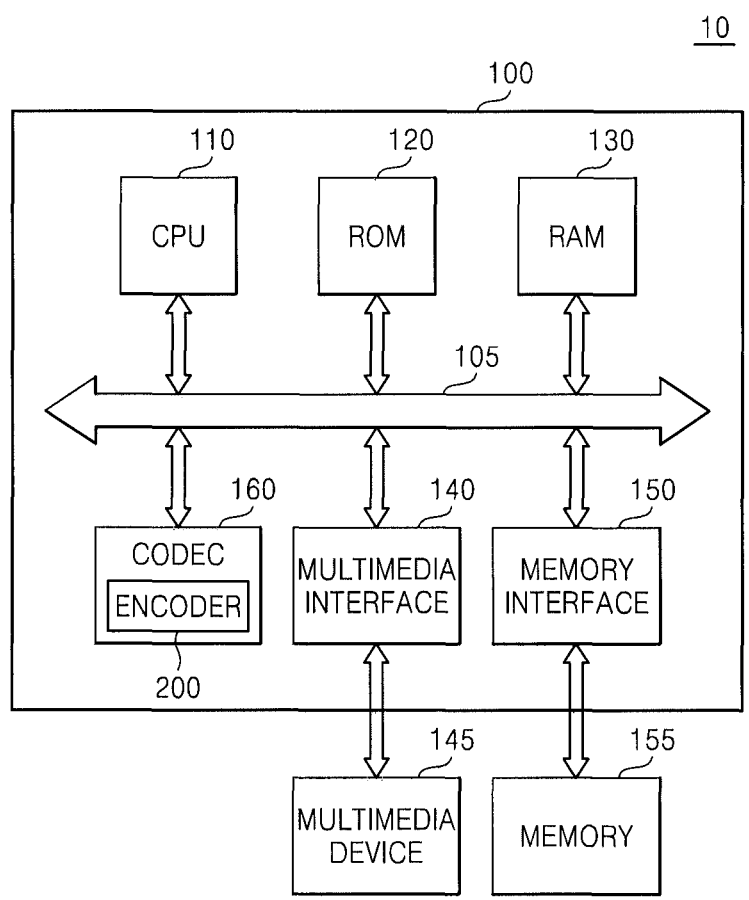
FIG. 1 is a block diagram of a data processing system according to some embodiments of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 10 according to an embodiment of the inventive concept. By way of non limiting examples, the data processing system 10 may be implemented in a mobile terminal such as a smart phone, a tablet Personal Computer (PC), a Personal Digital Assistant (PDA), an Enterprise Digital Assistant (EDA), a Mobile Internet Device (MID), a wearable computer, an Internet of Things (IoT) device, an Internet of Everything (IoE) device or an e-book.

The data processing system 10 may include a system on chip (SoC) 100, a multimedia device 145 and a memory 155.

The SoC 100 may function as a controller that controls the multimedia device 145 and the memory 155. The SoC 100 may include a Central Processing Unit (CPU) 110, a Read Only Memory (ROM) 120, a Random Access Memory (RAM) 130, a multimedia interface 140, a memory interface 150 and a codec 160.

The CPU 110, the ROM 120, the RAM 130, the multimedia interface 140, the memory interface 150, and the codec 160 may receive or transmit data and/or instructions (or command) with one another through a bus 105.

The CPU 110 may control the overall operation of the SoC 100. For instance, the CPU 110 may process (or execute) programs and/or data stored in the ROM 120, the RAM 130, and/or the memory 155. According to embodiments, the CPU 110 may be implemented as a single computing component. For example, in one embodiment the CPU 110 is a multi-core processor having two or more independent processors (or cores).

The ROM 120 may store programs and/or data that can be used by the CPU 110. According to embodiments, the ROM 120 may be implemented as an Erasable Programmable ROM (EPROM) or an Electrically Erasable Programmable ROM (EEPROM).

The RAM 130 may temporarily store programs, data, and/or instructions. According to embodiments, the RAM 130 may be implemented as a Dynamic RAM (DRAM) or a Static RAM (SRAM).

The multimedia interface 140 may receive, transmit or convert (i.e. interface) interface data received from the multimedia device 145 implemented outside the SoC 100 or data output to the multimedia device 145. The multimedia device 145 can be any device that can generate or process multimedia data. According to embodiments, the multimedia device 145 may be a camera including an image sensor, a video camera including an image sensor, or a display device.

The memory interface 150 may interface data received from the memory 155 implemented outside the SoC 100 or data output to the memory 155. According to embodiments, the memory 155 may be implemented as non-volatile memory such as a flash memory or a resistive memory. Alternatively, the memory 155 may be implemented as a flash-based memory such as an embedded Multi-Media Card (eMMC) or a Universal Flash Storage (UFS) device.

The codec 160 may encode or decode data received from the multimedia device 145 or data output to the multimedia device 145. The codec 160 may include a decoder (not shown) as well as an encoder 200.

Although the codec 160 is implemented outside the multimedia interface 140 in FIG. 1 to simplify the description, the codec 160 may be included in the multimedia interface 140. The scope of the inventive concept should not be restrictively interpreted in accordance with the position (or layout) of the codec 160. According to embodiments, the codec 160 may be implemented in software, hardware or a combination thereof. The multimedia interface 140 and the codec 160 may be respectively implemented in different integrated circuits (ICs).

The structure and operations of the encoder 200 will be described in detail with reference to FIG. 2 and FIG. 16.

Figure 2:
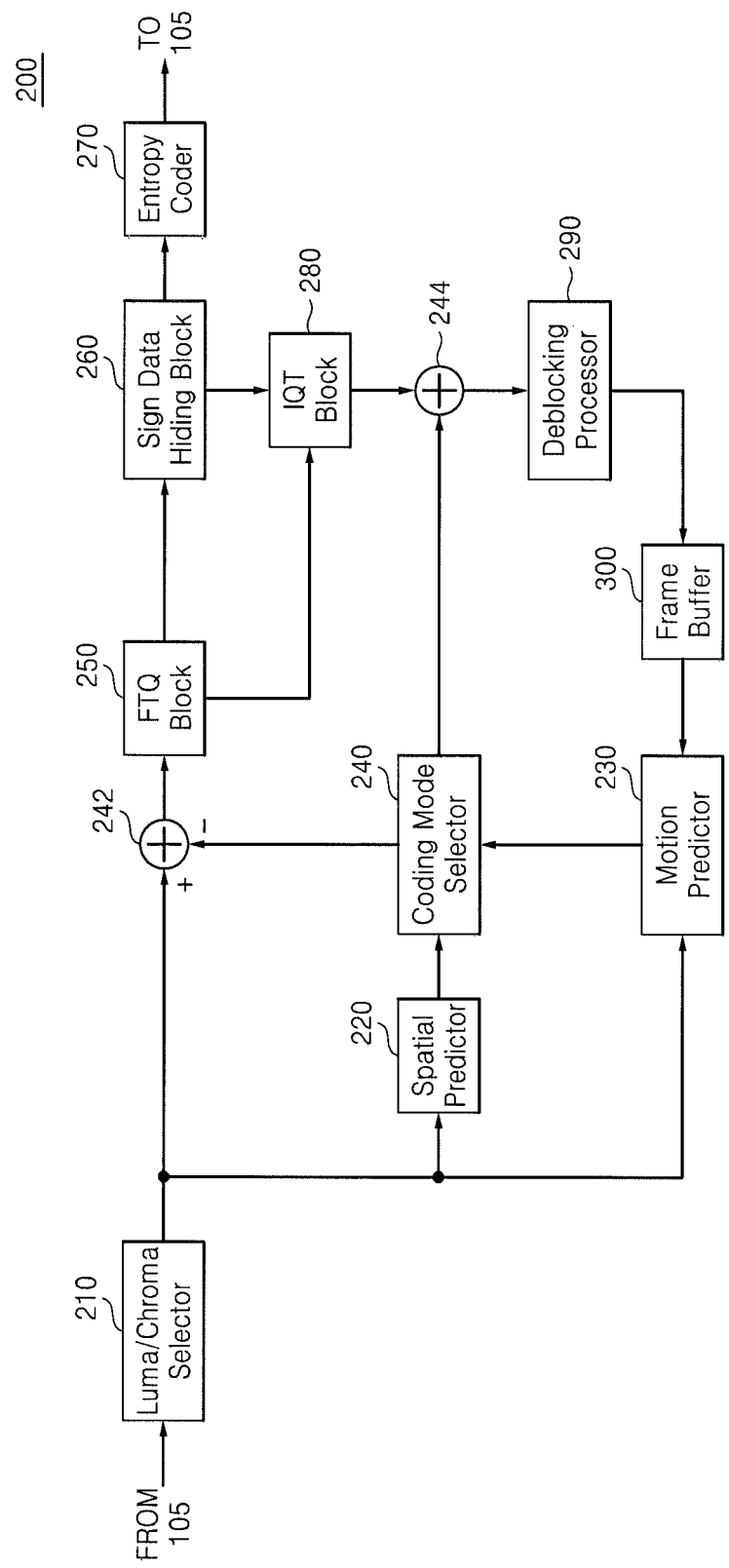
FIG. 2 is a block diagram of an encoder illustrated in FIG. 1 according to some embodiments of the inventive concept.

FIG. 2 is a block diagram of the encoder 200 illustrated in FIG. 1 according to an embodiment of the inventive concept. The structure and operation of the encoder 200 illustrated in FIG. 2 will be explained based on an H.264/Advanced Video Coding (AVC) codec although other protocols are envisioned within the scope of this disclosure. The scope of the invention is not restricted thereto and can be applied to a High Efficiency Video Coding (HEVC) codec in the same manner.

Referring to FIG. 1 and FIG. 2, the encoder 200 may include a luma/chroma selector 210, a spatial predictor 220, a motion predictor 230, a coding mode selector 240, a subtractor 242, an adder 244, a Forward Transform and Quantization (FTQ) block 250, a sign data hiding block 260, an entropy coder 270, an Inverse Quantization and Transform (IQT) block 280, a deblocking processor 290 and a frame buffer 300.

The luma/chroma selector 210 may select either a luma component or a chroma component, which is included in an input frame received through the bus 105, and may output a frame including the selected component as a current frame.

The spatial predictor 220 may determine the correlation between adjacent pixels of each of the pixels included in the current frame received from the luma/chroma selector 210, may generate a spatially-predicted frame based on the determination result and may transmit the spatially-predicted frame to the coding mode selector 240.

The motion predictor 230 may compare the current frame received from the luma/chroma selector 210 with a previous frame received from the frame buffer 300, may generate a motion-predicted frame according to the comparison result, and may transmit the motion-predicted frame to the coding mode selector 240.

The coding mode selector 240 may transmit either the spatially-predicted frame received from the spatial predictor 220 or the motion-predicted frame received from the motion predictor 230 to the subtractor 242 and the adder 244 according to a coding mode. The coding mode may be an intra coding mode or an inter coding mode.

According to embodiments, the coding mode selector 240 may transmit the spatially-predicted frame received from the spatial predictor 220 to the subtractor 242 and the adder 244 in the intra coding mode, or may transmit the motion-predicted frame received from the motion predictor 230 to the subtractor 242 and the adder 244 in the inter coding mode.

The subtractor 242 may generate a residual frame corresponding to a difference between the current frame received from the luma/chroma selector 210 and the spatially-predicted frame (or the motion-predicted frame) received from the coding mode selector 240.

The FTQ block 250 may transform and quantize the residual frame received from the subtractor 242 based on a transform unit. The FTQ block 250 may be a combination of a transform block performing a transform operation and a quantization block performing quantization. The transform unit transformed and quantized by the FTQ block 250 may be transmitted in parallel to the sign data hiding block 260 and the IQT block 280.

The sign data hiding block 260 may perform sign data hiding on the transform unit that has been transformed and quantized by the FTQ block 250. Sign data hiding will be described in detail with reference to FIG. 3 through FIG. 6 later. Sign data hiding may be referred to as sign bits hiding or data hiding.

The sign data hiding block 260 may select a particular line to define an adjustment target coefficient group in each of coefficient groups included in the transform unit, may calculate the sum of coefficients included in each coefficient group, and may adjust a value of one of adjustment target coefficients included in the adjustment target coefficient group defined in each coefficient group according to the calculation result.

The sign data hiding block 260 may transmit the transform unit, on which sign data hiding has been completely performed, to the entropy coder 270 and the IQT block 280.

The entropy coder 270 may perform entropy coding on the transform unit received from the sign data hiding block 260 and then output the transform unit to the bus 105.

The IQT block 280 may perform an inverse-quantization and an inverse-transform on the transform unit received from the FTQ block 250 and the transform unit received from the sign data hiding block 260. The IQT block 280 may be a combination of an inverse-quantization block performing inverse-quantization and an inverse-transform block performing inverse-transform.

The operations of the FTQ block 250, the sign data hiding block 260, and the IQT block 280 will be described in detail with reference to FIG. 7 through FIG. 13 later.

The adder 244 adds a frame that has been subjected to the inverse-quantization and the inverse-transform by the IQT block 280 and the spatially-predicted frame (or the motion-predicted frame) received from the coding mode selector 240, thereby restoring the current frame output from the luma/chroma selector 210.

The deblocking processor 290 may perform post-processing on the current frame restored by the adder 244 to eliminate blocking artifact. The frame buffer 300 may buffer the current frame that has been processed by the deblocking processor 290 and may transmit the buffered current frame to the motion predictor 230 as a previous frame.

Figure 3:
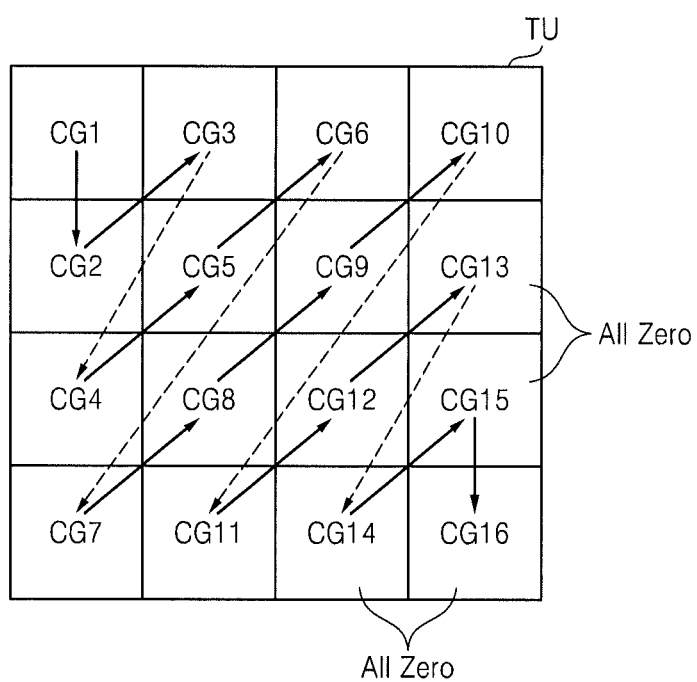
FIGS. 3 through 6 are diagrams showing conventional sign data hiding.

FIG. 3 through FIG. 6 are diagrams for explaining conventional sign data hiding. Referring to FIG. 2 and FIG. 3, the FTQ block 250 may transform and quantize a transform unit (TU) including a plurality of coefficient groups CG1 through CG16.

The first through 16th coefficient groups CG1 through CG16 may be sequentially arranged through a transform operation performed by the FTQ block 250. In the example embodiment of FIG. 3, it is assumed that coefficients included in the 13th through 16th coefficient groups CG13 through CG16 among the coefficient groups CG1 through CG16 have a value of "0".

Figure 4:
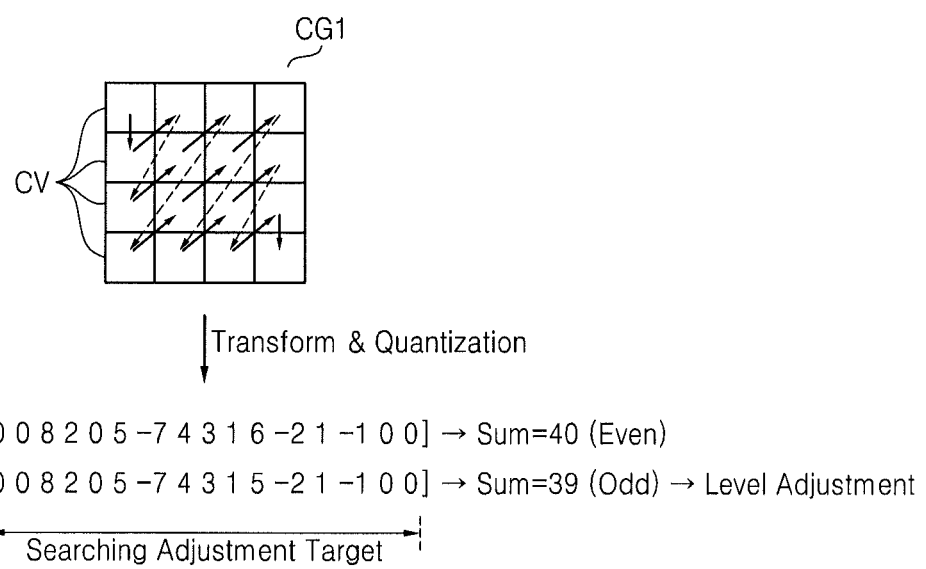

Referring to FIG. 2 and FIG. 4, the coefficient groups CG2 through CG16 may include a plurality of coefficients CV similar to the first coefficient group CG1. The coefficients CV in the first coefficient group CG1 may be arranged by the transform operation of the FTQ block 250 in a direction shown by the arrows in FIG. 4. In other words, the transform operation may include a process of transforming the coefficients CV in a spatial domain into the coefficients CV in a spectral domain.

The transformed coefficients CV may be quantized. In a first case (CASE1), the coefficients CV that have been transformed and quantized in the first coefficient group CG1 may be expressed as [0 0 8 2 0 5 −7 4 3 1 6 −2 1 −1 0 0].

In order to reduce the number of bits, the sign data hiding block 260 may include a sign bit, which indicates a sign of the first non-zero coefficient (e.g. a coefficient that does not have a value of "0") among the transformed and quantized coefficients CV, using the sum of absolute values of the transformed and quantized coefficients CV. For instance, when the sum of the absolute values is an even number, the sign bit may indicate a plus sign (+). When the sum of the absolute values is an odd number, the sign bit may indicate a minus sign (−).

In other words, in CASE1, where the sum of the absolute values of the transformed and quantized coefficients CV is an even number, (e.g., 40), the sign (e.g., "+") of the first non-zero coefficient (e.g., "8" in the third place) is correctly represented. However, in a second case (CASE2), where the sum of the absolute values of the transformed and quantized coefficients CV is an odd number, (e.g., 39), the sign (e.g., "+") of the first non-zero coefficient (e.g., "8" in the third place) cannot be correctly represented. Therefore, the sign data hiding block 260 increases or decreases the value of one of the transformed and quantized coefficients CV by "1" in CASE2 so that the sum of the absolute values of the transformed and quantized coefficients CV becomes an even number. In the embodiments of the inventive concept, a case where coefficient adjustment is required during sign data hiding may be a case similar to CASE2.

For the coefficient adjustment, the sign data hiding block 260 needs to search for a coefficient most appropriate to the adjustment among the transformed and quantized coefficients CV. For instance, the sign data hiding block 260 may search for a coefficient that least affects the picture quality of the restored image when it is adjusted. At the time represented by FIG. 4, for CASE2, all of the coefficients CV included in the first coefficient group CG1 are targets of the search.

Figure 5:
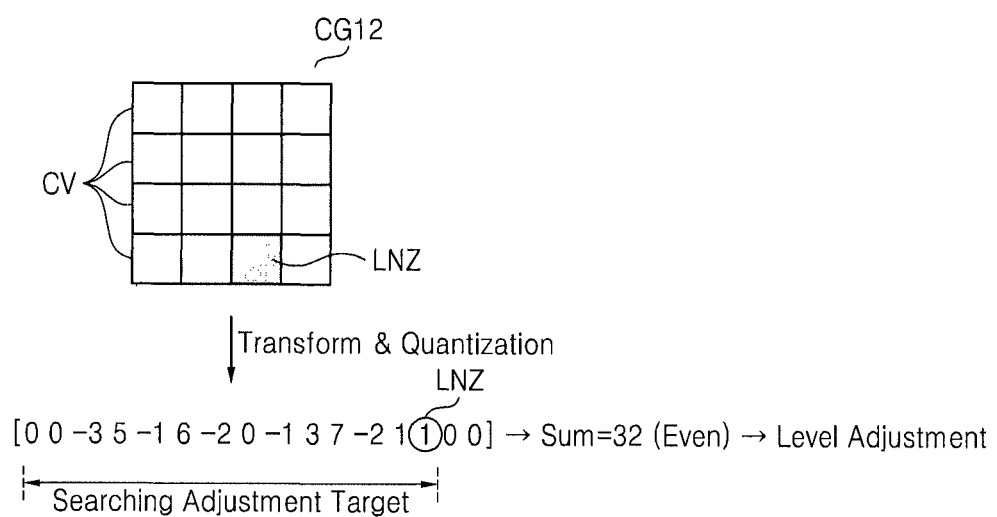

Referring to FIG. 2, FIG. 3 and FIG. 5, where the sum of the absolute values of the coefficients CV included in the 12th coefficient group CG12 is an even number, (e.g., 32), the sign (e.g., "−") of the first non-zero coefficient (e.g., "−3" in the third place) cannot be represented correctly. In other words, one of the coefficients CV included in the 12th coefficient group CG12 needs to be adjusted. However, as shown in FIG. 5, adjustment targets are limited to the first coefficient through a last non-zero coefficient (LNZ) in the 12th coefficient group CG12 according to the conventional sign data hiding.

In the conventional sign data hiding, a scan operation to search for the last non-zero coefficient LNZ, in the coefficients CV included in the transform unit TU, needs to be performed to limit adjustment target coefficients. By way of a non-limiting example, an up-right-diagonal scan operation is illustrated in FIG. 3 through FIG. 5, but the scan direction may be in a different direction and this disclosure is not restricted thereto.

Figure 6:
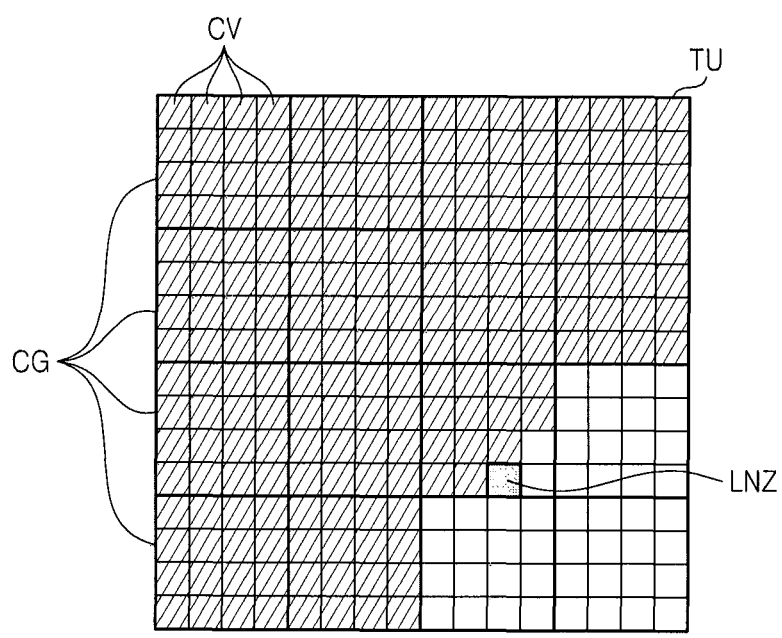

Referring to FIG. 6, adjustment target coefficients in the conventional sign data hiding are marked with hatched lines. In the conventional sign data hiding, a range of adjustment target coefficients is not fixed or is not included in a predetermined group but may vary with the position of the LNZ.

By way of a non-limiting example, the transform unit TU including 256 (e.g. 16×16) coefficients CV is illustrated in FIG. 4 through FIG. 6, but the size of the transform unit TU is not restricted thereto and may vary with different embodiments and design specifications.

Figure 7:
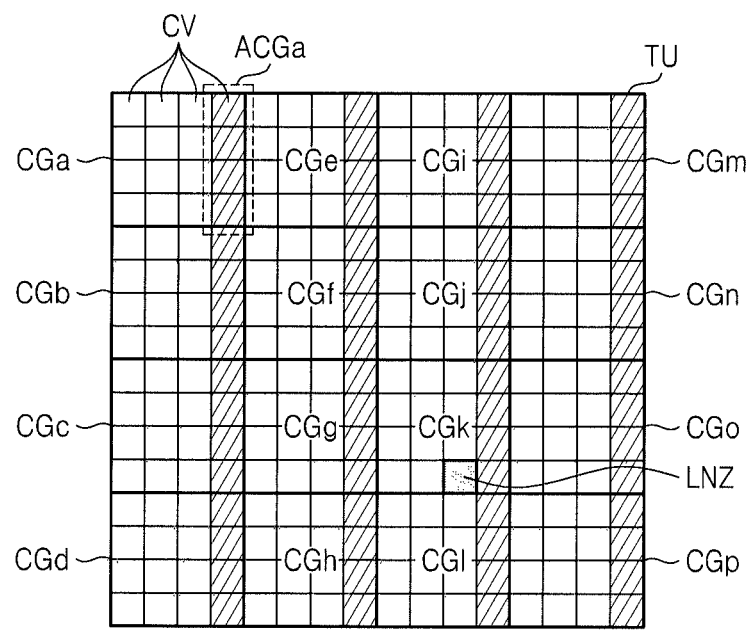
FIG. 7 is a diagram of a transform unit including an adjustment target coefficient group according to some embodiments of the inventive concept.
Figure 8:
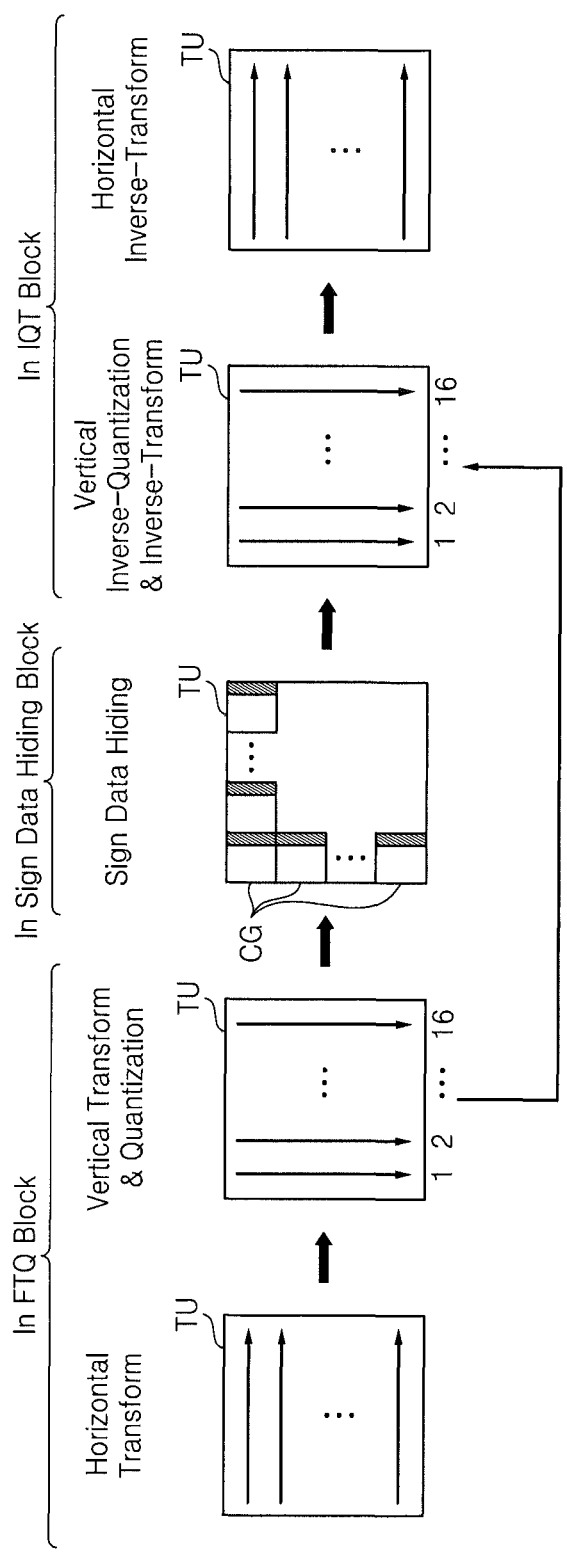
FIG. 8 is a diagram illustrating a procedure for processing the transform unit illustrated in FIG. 7.

FIG. 7 is a diagram of the transform unit TU including an adjustment target coefficient group ATCG1 according to some embodiments of the inventive concept. FIG. 8 is a diagram illustrating a procedure for processing the transform unit TU illustrated in FIG. 7. By way of a non-limiting example, it is assumed that the transform unit TU includes 16 (e.g. 4×4) coefficient groups CGa through CGp and each of the coefficient groups CGa through CGp includes 16 (e.g. 4×4) coefficients CV in the embodiments illustrated in FIG. 7, FIG. 9, FIG. 11, FIG. 13 and FIG. 15.

Referring to FIG. 7, a particular line is selected to define an adjustment target coefficient group in each of the coefficient groups CGa through CGp included in the transform unit TU. The particular line may be a certain column among a plurality of columns in the coefficient groups CGa through CGp. The particular line may also be individually determined for each transform unit TU. The particular line may also be the rightmost column among the plurality of columns included in each of the coefficient groups CGa through CGp.

The adjustment target coefficient group ATCG1 is a set of coefficients in the rightmost columns of the coefficient groups CGa through CGp. As shown in FIG. 7, the rightmost column of each of the coefficient groups CGa through CGp includes four coefficients. The adjustment target coefficient group ATCG1 may be a set of coefficients included in portions of the coefficient groups CGa through CGp. In other words, the adjustment target coefficient group ATCG1 may include a particular line, (e.g., the rightmost column which is selected in each of the coefficient groups CGa through CGp and has the same position in the coefficient groups CGa through CGp).

The scan operation of searching for the LNZ is not necessary because the coefficients to be included in the adjustment target coefficient group ATCG1 are predetermined. The LNZ may, or may not, be included in the adjustment target coefficient group ATCG1.

The sign data hiding block 260 (shown in FIG. 2) may calculate the sum of a plurality (e.g., 16) of coefficients included in each of the coefficient groups CGa through CGp and may adjust the value of one of a plurality (e.g. 4) of adjustment target coefficients included in an adjustment target coefficient group defined in each of the coefficient groups CGa through CGp according to the calculation result.

For instance, when the sum of 16 coefficients included in the first coefficient group CGa is an even number and the sign of the first non-zero coefficient among the 16 coefficients is a minus sign, the sign data hiding block 260 may adjust the value of one of four adjustment target coefficients included in an adjustment target coefficient group ACGa defined in the first coefficient group CGa.

When the sum of the 16 coefficients included in the first coefficient group CGa is an odd number and the sign of the first non-zero coefficient among the 16 coefficients is a plus sign, the sign data hiding block 260 may adjust the value of one of the four adjustment target coefficients included in the adjustment target coefficient group ACGa defined in the first coefficient group CGa. Here, to adjust means to increase or decrease the value of the coefficient by one. In other embodiments, the sign data hiding is not performed.

Sign data hiding performed with respect to the other coefficient groups CGb through CGp is performed substantially in the same way as with the first coefficient group CGa.

Referring to FIG. 2, FIG. 7 and FIG. 8, the FTQ block 250 may perform a horizontal transform on the transform unit TU and then perform a vertical transform and quantization on the horizontal-transformed transform unit TU.

The FTQ block 250 may perform the vertical transform and quantization on the transform unit TU sequentially starting from the leftmost column. The FTQ block 250 may transmit columns on which the vertical transform and quantization is completed to the sign data hiding block 260 and the IQT block 280 column by column.

The rightmost column of each of the coefficient groups CGa through CGp may be included in the adjustment target coefficient group ATCG1 and the value of one of a plurality (e.g. 4) of coefficients included in an adjustment target coefficient group defined in each of the coefficient groups CGa through CGp may be adjusted through sign data hiding. However, the other columns excluding the rightmost column in each of the coefficient groups CGa through CGp are not included in the adjustment target coefficient group ATCG1, and therefore, the other columns may be transmitted to the IQT block 280 and vertical inverse-quantization and inverse-transform may be performed on the other columns in parallel with the sign data hiding.

For instance, the IQT block 280 may perform the vertical inverse-quantization and inverse-transform on the first through third columns starting from the leftmost side using coefficients, which are transmitted column by column from the FTQ block 250, in parallel with the sign data hiding.

The IQT block 280 may perform the vertical inverse-quantization and inverse-transform on the rightmost column using coefficients transmitted after being processed by the sign data hiding block 260. Accordingly, time taken for the sign data hiding is saved. The IQT block 280 may perform horizontal inverse-transform on the transform unit TU on which the vertical inverse-quantization and inverse-transform has been completed.

Figure 9:
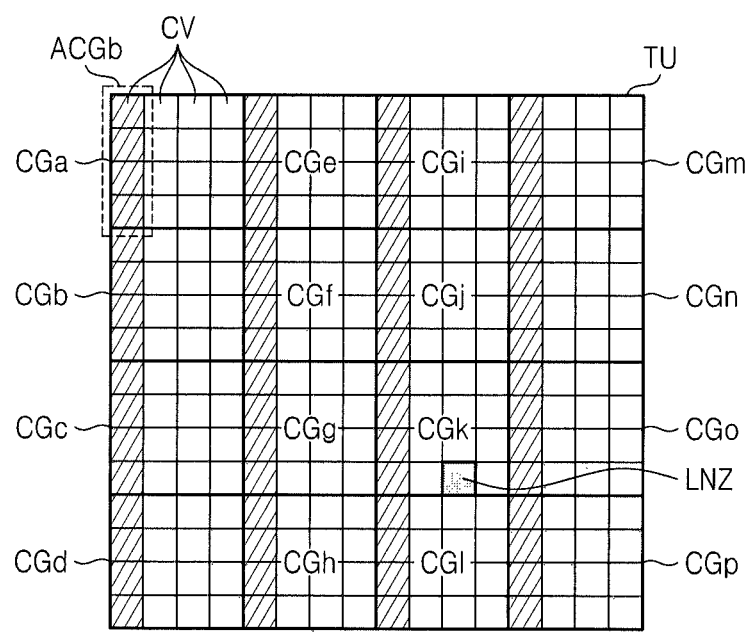
FIG. 9 is a diagram of a transform unit including an adjustment target coefficient group according to other embodiments of the inventive concept.
Figure 10:
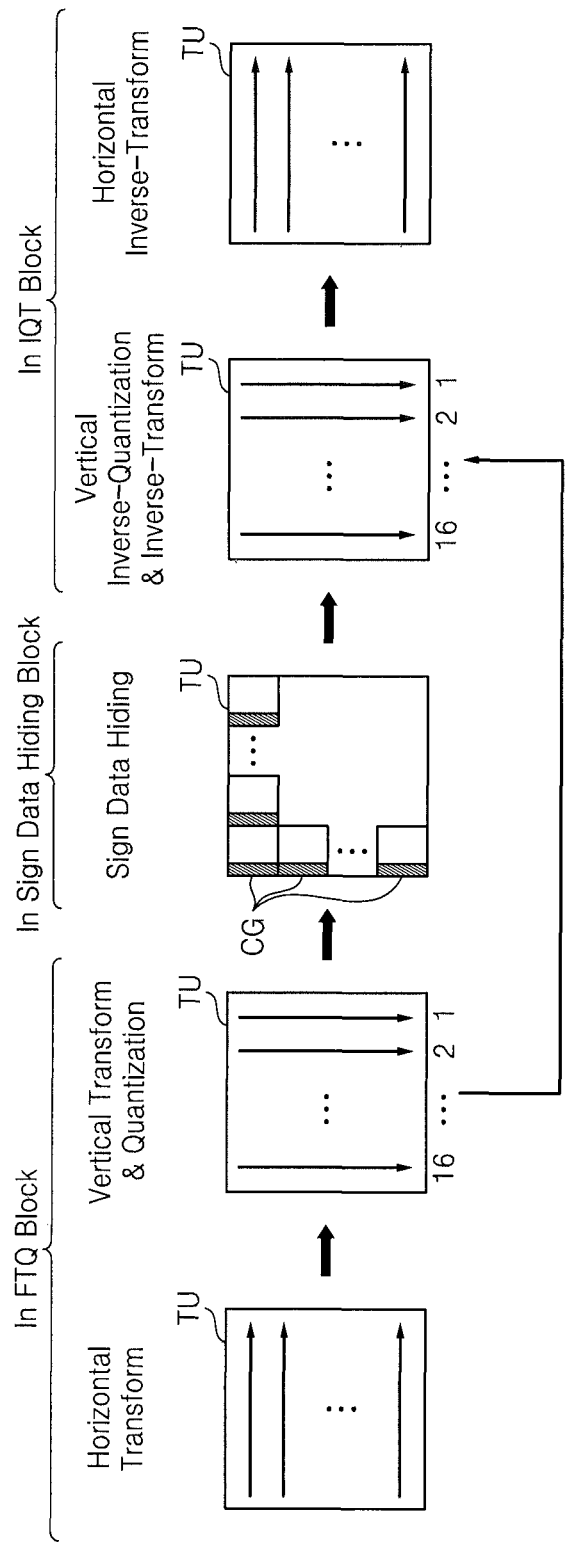
FIG. 10 is a diagram illustrating a procedure for processing the transform unit illustrated in FIG. 9.

FIG. 9 is a diagram of a transform unit TU including an adjustment target coefficient group ATCG2 according to other embodiments of the inventive concept. FIG. 10 is a diagram illustrating a procedure for processing the transform unit TU illustrated in FIG. 9.

Referring to FIG. 9, a particular line is selected to define an adjustment target coefficient group in each of the coefficient groups CGa through CGp included in the transform unit TU. The particular line may be a certain column among a plurality of columns in the coefficient groups CGa through CGp. The particular line may be individually determined for each transform unit TU. The particular line may be the leftmost column among the plurality of columns included in each of the coefficient groups CGa through CGp.

The adjustment target coefficient group ATCG2 is a set of coefficients in the leftmost columns of the coefficient groups CGa through CGp. As shown in FIG. 9, the leftmost column of each of the coefficient groups CGa through CGp includes four coefficients.

The adjustment target coefficient group ATCG2 may be a set of coefficients included in portions of the coefficient groups CGa through CGp. In other words, the adjustment target coefficient group ATCG2 may include a particular line, (e.g. the leftmost column. which is selected in each of the coefficient groups CGa through CGp and has the same position in the coefficient groups CGa through CGp).

The scan operation of searching for the LNZ is not necessary because the coefficients to be included in the adjustment target coefficient group ATCG2 are predetermined. The LNZ may or may not be included in the adjustment target coefficient group ATCG2.

The sign data hiding block 260 (shown in FIG. 2) may calculate the sum of a plurality (e.g. 16) of coefficients included in each of the coefficient groups CGa through CGp and may adjust the value of one of a plurality (e.g. 4) of adjustment target coefficients included in an adjustment target coefficient group defined in each of the coefficient groups CGa through CGp according to the calculation result.

For instance, when the sum of 16 coefficients included in the first coefficient group CGa is an even number and the sign of the first non-zero coefficient among the 16 coefficients is a minus sign, the sign data hiding block 260 may adjust the value of one of four adjustment target coefficients included in an adjustment target coefficient group ACGb defined in the first coefficient group CGa.

When the sum of the 16 coefficients included in the first coefficient group CGa is an odd number and the sign of the first non-zero coefficient among the 16 coefficients is a plus sign, the sign data hiding block 260 may adjust the value of one of the four adjustment target coefficients included in the adjustment target coefficient group ACGb defined in the first coefficient group CGa. Here, to adjust means to increase or decrease the value of the coefficient by one. In other embodiments, the sign data hiding is not performed.

Sign data hiding performed with respect to the other coefficient groups CGb through CGp is substantially the same as that with respect to the first coefficient group CGa.

Referring to FIG. 2, FIG. 9 and FIG. 10, the FTQ block 250 may perform horizontal transform on the transform unit TU and then perform vertical transform and quantization on the horizontal-transformed transform unit TU. The FTQ block 250 may perform the vertical transform and quantization on the transform unit TU sequentially starting from the rightmost column. The FTQ block 250 may transmit columns on which the vertical transform and quantization is completed to the sign data hiding block 260 and the IQT block 280 column by column.

The leftmost column of each of the coefficient groups CGa through CGp may be included in the adjustment target coefficient group ATCG2 and the value of one of a plurality (e.g. 4) of coefficients included in an adjustment target coefficient group defined in each of the coefficient groups CGa through CGp may be adjusted through sign data hiding.

However, the other columns excluding the leftmost column in each of the coefficient groups CGa through CGp are not included in the adjustment target coefficient group ATCG2, and therefore, the other columns may be transmitted to the IQT block 280 and vertical inverse-quantization and inverse-transform may be performed on the other columns in parallel with the sign data hiding. Accordingly, time taken for the sign data hiding is saved.

For instance, the IQT block 280 may perform the vertical inverse-quantization and inverse-transform on the first through third columns starting from the rightmost side using coefficients, which are transmitted column by column from the FTQ block 250, in parallel with the sign data hiding. The IQT block 280 may perform the vertical inverse-quantization and inverse-transform on the leftmost column using coefficients transmitted after being processed by the sign data hiding block 260. The IQT block 280 may perform horizontal inverse-transform on the transform unit TU on which the vertical inverse-quantization and inverse-transform has been completed.

Figure 11:
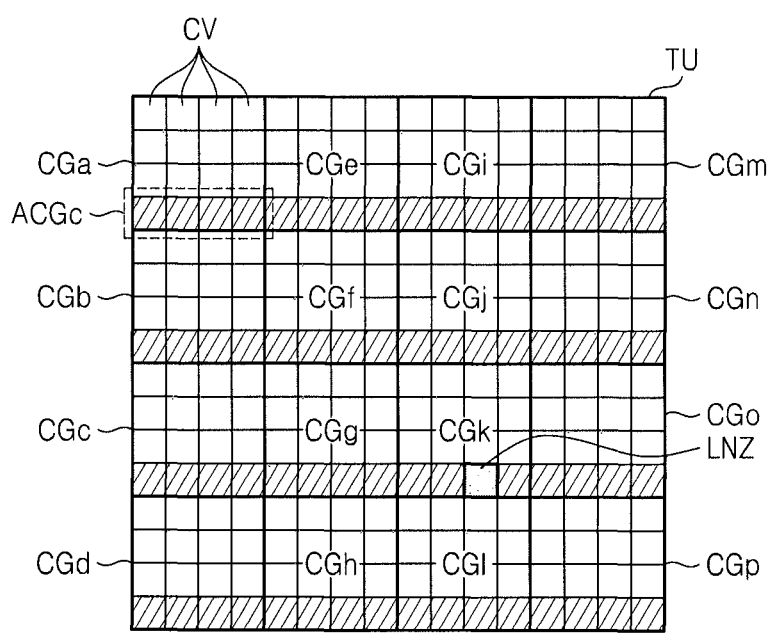
FIG. 11 is a diagram of a transform unit including an adjustment target coefficient group according to further embodiments of the inventive concept.
Figure 12:
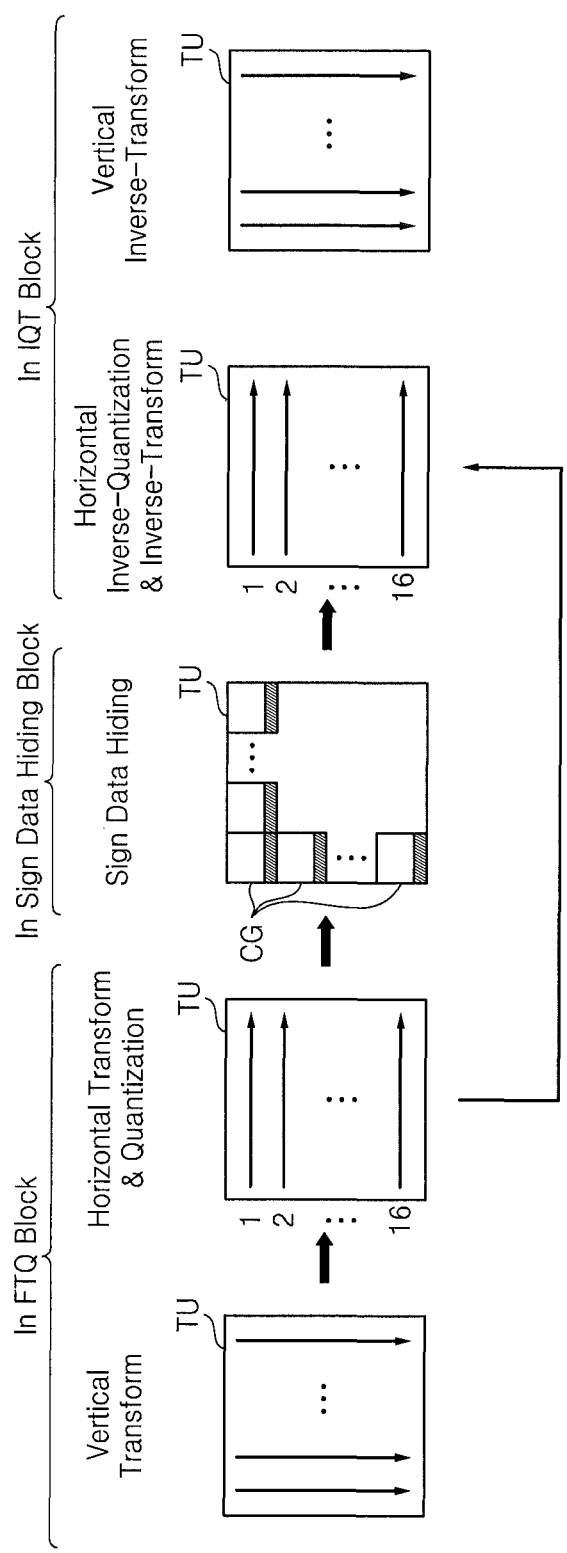
FIG. 12 is a diagram illustrating a procedure for processing the transform unit illustrated in FIG. 11.

FIG. 11 is a diagram of a transform unit TU including an adjustment target coefficient group ATCG3 according to further embodiments of the inventive concept. FIG. 12 is a diagram illustrating a procedure for processing the transform unit TU illustrated in FIG. 11. Referring to FIG. 11, a particular line is selected to define an adjustment target coefficient group in each of the coefficient groups CGa through CGp included in the transform unit TU. The particular line may be a certain row among a plurality of rows in the coefficient groups CGa through CGp. The particular line may be individually determined for each transform unit TU. The particular line may be the bottommost row among the plurality of rows included in each of the coefficient groups CGa through CGp.

The adjustment target coefficient group ATCG3 is a set of coefficients in the bottommost rows of the coefficient groups CGa through CGp. As shown in FIG. 11, the bottommost row of each of the coefficient groups CGa through CGp includes four coefficients. The adjustment target coefficient group ATCG3 may be a set of coefficients included in portions of the coefficient groups CGa through CGp. In other words, the adjustment target coefficient group ATCG3 may include a particular line, e.g., the bottommost row which is selected in each of the coefficient groups CGa through CGp and has the same position in the coefficient groups CGa through CGp.

The scan operation of searching for the last non-zero coefficient LNZ is not necessary because the coefficients to be included in the adjustment target coefficient group ATCG3 are predetermined. The LNZ may or may not be included in the adjustment target coefficient group ATCG3.

The sign data hiding block 260 (shown in FIG. 2) may calculate the sum of a plurality (e.g. 16) of coefficients included in each of the coefficient groups CGa through CGp and may adjust the value of one of a plurality (e.g. 4) of adjustment target coefficients included in an adjustment target coefficient group defined in each of the coefficient groups CGa through CGp according to the calculation result.

For instance, when the sum of 16 coefficients included in the first coefficient group CGa is an even number and the sign of the first non-zero coefficient among the 16 coefficients is a minus sign, the sign data hiding block 260 may adjust the value of one of four adjustment target coefficients included in an adjustment target coefficient group ACGc defined in the first coefficient group CGa.

When the sum of the 16 coefficients included in the first coefficient group CGa is an odd number and the sign of the first non-zero coefficient among the 16 coefficients is a plus sign, the sign data hiding block 260 may adjust the value of one of the four adjustment target coefficients included in the adjustment target coefficient group ACGc defined in the first coefficient group CGa. Here, to adjust means to increase or decrease the value of the coefficient by one. In other embodiments, the sign data hiding is not performed.

Sign data hiding performed with respect to the other coefficient groups CGb through CGp is substantially the same as that with respect to the first coefficient group CGa.

Referring to FIG. 2, FIG. 11 and FIG. 12, the FTQ block 250 may perform vertical transform on the transform unit TU and then perform horizontal transform and quantization on the vertical-transformed transform unit TU. The FTQ block 250 may perform the horizontal transform and quantization on the transform unit TU sequentially starting from the topmost row. The FTQ block 250 may transmit rows on which the horizontal transform and quantization is completed to the sign data hiding block 260 and the IQT block 280 row by row.

The bottommost row of each of the coefficient groups CGa through CGp may be included in the adjustment target coefficient group ATCG3 and the value of one of a plurality (e.g. 4) of coefficients included in an adjustment target coefficient group defined in each of the coefficient groups CGa through CGp may be adjusted through sign data hiding.

However, the other rows excluding the bottommost row in each of the coefficient groups CGa through CGp are not included in the adjustment target coefficient group ATCG3, and therefore, the other rows may be transmitted to the IQT block 280 and horizontal inverse-quantization and inverse-transform may be performed on the other rows in parallel with the sign data hiding. Accordingly, time taken for the sign data hiding is saved.

For instance, the IQT block 280 may perform the horizontal inverse-quantization and inverse-transform on the first through third rows starting from the topmost side using coefficients, which are transmitted row by row from the FTQ block 250, in parallel with the sign data hiding. The IQT block 280 may perform the horizontal inverse-quantization and inverse-transform on the bottommost row using coefficients transmitted after being processed by the sign data hiding block 260. The IQT block 280 may perform vertical inverse-transform on the transform unit TU on which the horizontal inverse-quantization and inverse-transform has been completed.

Figure 13:
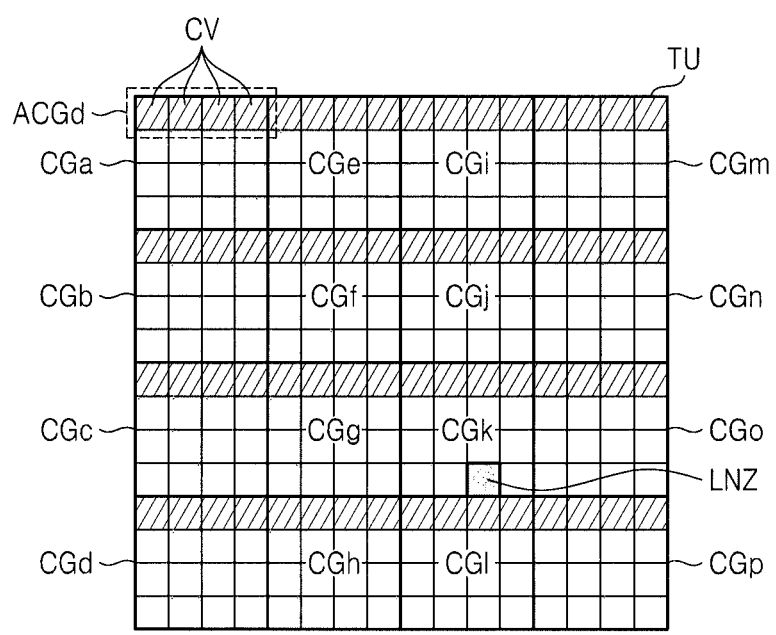
FIG. 13 is a diagram of a transform unit including an adjustment target coefficient group according to other embodiments of the inventive concept.
Figure 14:
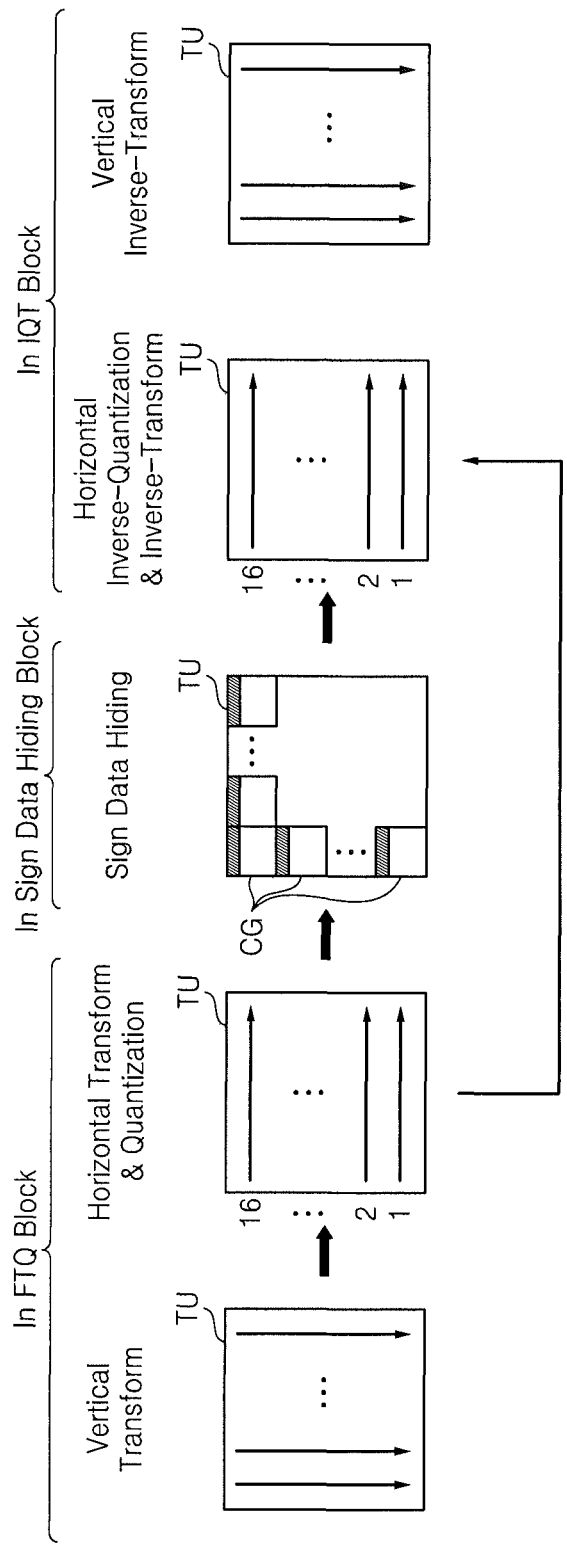
FIG. 14 is a diagram illustrating a procedure for processing the transform unit illustrated in FIG. 13.

FIG. 13 is a diagram of a transform unit TU including an adjustment target coefficient group ATCG4 according to other embodiments of the inventive concept. FIG. 14 is a diagram illustrating a procedure for processing the transform unit TU illustrated in FIG. 13. Referring to FIG. 13, a particular line is selected to define an adjustment target coefficient group in each of the coefficient groups CGa through CGp included in the transform unit TU. The particular line may be a certain row among a plurality of rows in the coefficient groups CGa through CGp. The particular line may be individually determined for each transform unit TU. The particular line may be the topmost row among the plurality of rows included in each of the coefficient groups CGa through CGp.

The adjustment target coefficient group ATCG4 is a set of coefficients in the topmost rows of the coefficient groups CGa through CGp. As shown in FIG. 13, the topmost row of each of the coefficient groups CGa through CGp includes four coefficients. The adjustment target coefficient group ATCG4 may be a set of coefficients included in portions of the coefficient groups CGa through CGp. In other words, the adjustment target coefficient group ATCG4 may include a particular line, (e.g. the topmost row, which is selected in each of the coefficient groups CGa through CGp and has the same position in the coefficient groups CGa through CGp).

The scan operation of searching for the last non-zero coefficient LNZ is not necessary because the coefficients to be included in the adjustment target coefficient group ATCG4 are predetermined. The LNZ may or may not be included in the adjustment target coefficient group ATCG4.

The sign data hiding block 260 (shown in FIG. 2) may calculate the sum of a plurality (e.g. 16) of coefficients included in each of the coefficient groups CGa through CGp and may adjust the value of one of a plurality (e.g. 4) of adjustment target coefficients included in an adjustment target coefficient group defined in each of the coefficient groups CGa through CGp according to the calculation result.

For instance, when the sum of 16 coefficients included in the first coefficient group CGa is an even number and the sign of the first non-zero coefficient among the 16 coefficients is a minus sign, the sign data hiding block 260 may adjust the value of one of four adjustment target coefficients included in an adjustment target coefficient group ACGd defined in the first coefficient group CGa.

When the sum of the 16 coefficients included in the first coefficient group CGa is an odd number and the sign of the first non-zero coefficient among the 16 coefficients is a plus sign, the sign data hiding block 260 may adjust the value of one of the four adjustment target coefficients included in the adjustment target coefficient group ACGd defined in the first coefficient group CGa. Here, to adjust means to increase or decrease the value of the coefficient by one. In other embodiments, the sign data hiding is not performed.

Sign data hiding performed with respect to the other coefficient groups CGb through CGp is substantially the same as that with respect to the first coefficient group CGa.

Referring to FIG. 2, FIG. 13 and FIG. 14, the FTQ block 250 may perform vertical transform on the transform unit TU and then perform horizontal transform and quantization on the vertical-transformed transform unit TU. The FTQ block 250 may perform the horizontal transform and quantization on the transform unit TU sequentially starting from the bottommost row. The FTQ block 250 may transmit rows on which the horizontal transform and quantization is completed to the sign data hiding block 260 and the IQT block 280 row by row.

The topmost row of each of the coefficient groups CGa through CGp may be included in the adjustment target coefficient group ATCG4 and the value of one of a plurality (e.g. 4) of coefficients included in an adjustment target coefficient group defined in each of the coefficient groups CGa through CGp may be adjusted through sign data hiding.

However, the other rows excluding the topmost row in each of the coefficient groups CGa through CGp are not included in the adjustment target coefficient group ATCG4, and therefore, the other rows may be transmitted to the IQT block 280 and horizontal inverse-quantization and inverse-transform may be performed on the other rows in parallel with the sign data hiding. Accordingly, time taken for the sign data hiding is saved.

For instance, the IQT block 280 may perform the horizontal inverse-quantization and inverse-transform on the first through third rows starting from the bottommost side using coefficients, which are transmitted row by row from the FTQ block 250, in parallel with the sign data hiding. The IQT block 280 may perform the horizontal inverse-quantization and inverse-transform on the topmost row using coefficients transmitted after being processed by the sign data hiding block 260. The IQT block 280 may perform vertical inverse-transform on the transform unit TU on which the horizontal inverse-quantization and inverse-transform has been completed.

Figure 15:
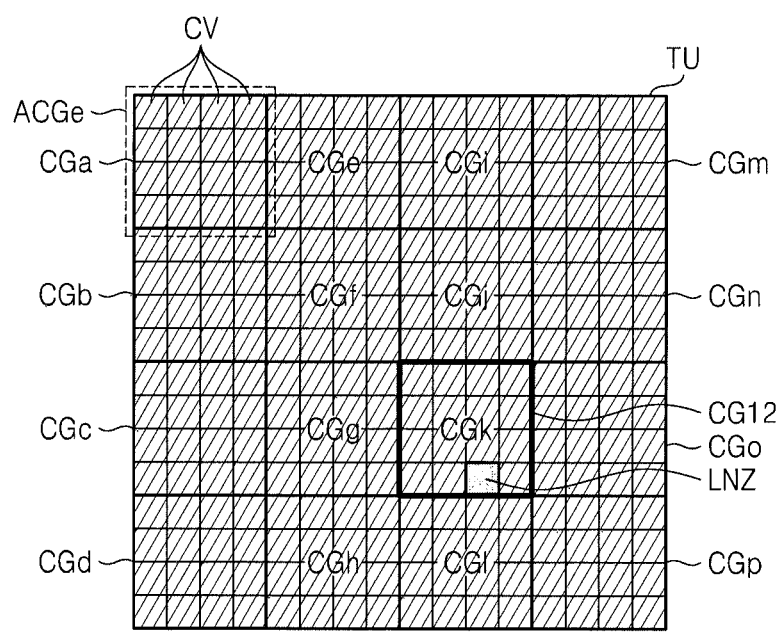
FIG. 15 is a diagram of a transform unit including an adjustment target coefficient group according to yet other embodiments of the inventive concept.

FIG. 15 is a diagram of a transform unit TU including an adjustment target coefficient group ATCG5 according to another embodiment of the inventive concept. Referring to FIG. 15, each of the coefficient groups CGa through CGp included in the transform unit TU is selected to be included in the adjustment target coefficient group ATCG5.

Since the coefficients to be included in the adjustment target coefficient group ATCG5 are predetermined, the scan operation of searching for the LNZ is not necessary. The LNZ may, or may not, be included in the adjustment target coefficient group ATCG5.

The sign data hiding block 260 (shown in FIG. 2) may calculate the sum of a plurality (e.g. 16) of coefficients included in each of the coefficient groups CGa through CGp and may adjust the value of one of the plurality (i.e. 16) of coefficients included in each of the coefficient groups CGa through CGp according to the calculation result.

For instance, when the sum of 16 coefficients included in the first coefficient group CGa is an even number and the sign of the first non-zero coefficient among the 16 coefficients is a minus sign, the sign data hiding block 260 may adjust the value of one of 16 adjustment target coefficients included in an adjustment target coefficient group ACGe defined in the first coefficient group CGa.

When the sum of the 16 coefficients included in the first coefficient group CGa is an odd number and the sign of the first non-zero coefficient among the 16 coefficients is a plus sign, the sign data hiding block 260 may adjust the value of one of the 16 adjustment target coefficients included in the adjustment target coefficient group ACGe defined in the first coefficient group CGa. Here, to adjust means to increase or decrease the value of the coefficient by 1. In other embodiments the sign data hiding is not performed.

Sign data hiding performed with respect to the other coefficient groups CGb through CGp is substantially the same as that with respect to the first coefficient group CGa.

With respect to the 12th coefficient group CG12 (i.e. CGk), the range of adjustment target coefficients is not limited to a range from the first coefficient to the last LNZ as shown in FIG. 6, but any one of 16 coefficients included in the 12th coefficient group CG12 (i.e. CGk) is adjusted.

Figure 16:
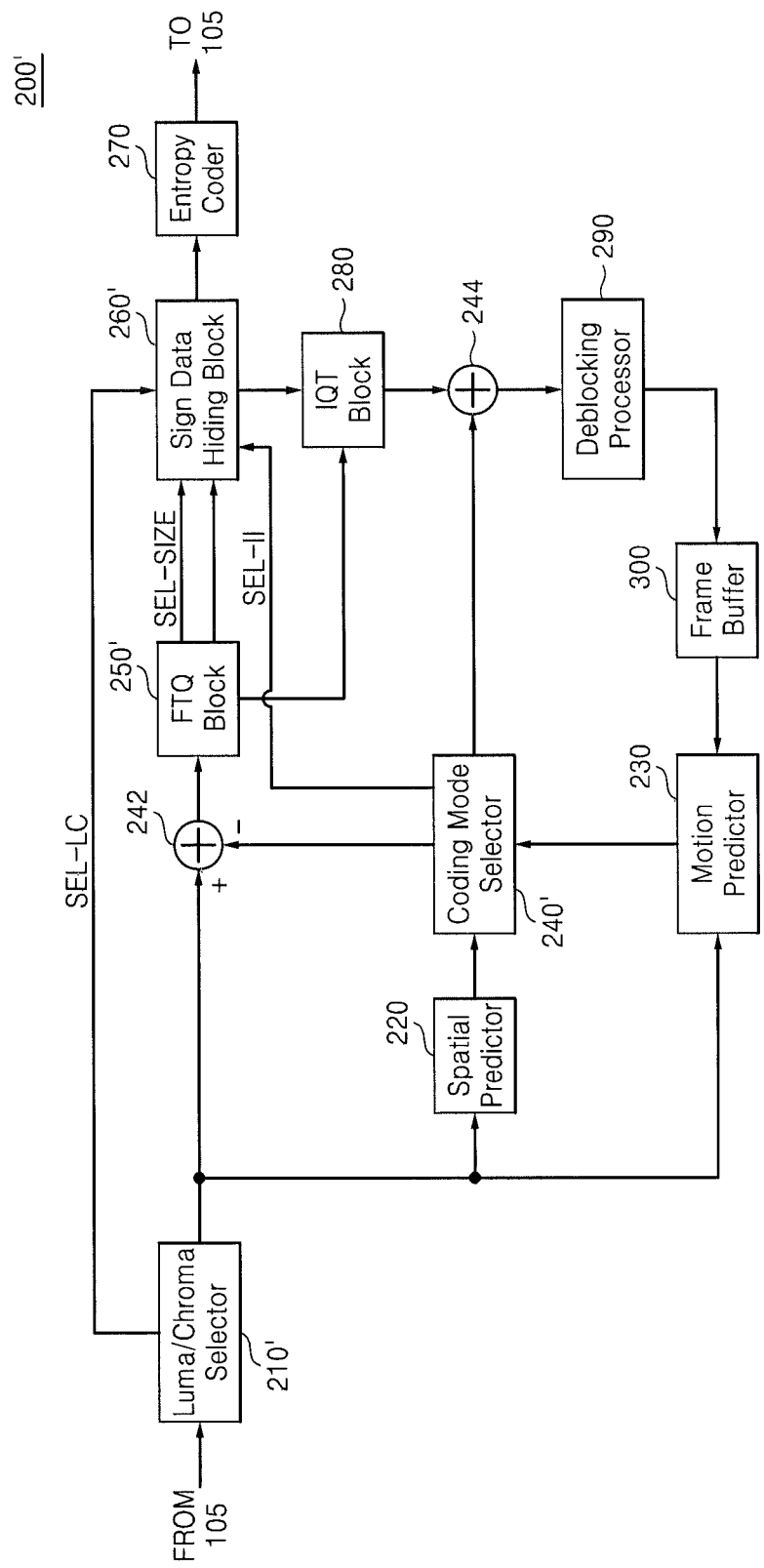
FIG. 16 is block diagram of an encoder according to other embodiments of the inventive concept.

FIG. 16 is block diagram of an encoder 200' according to other embodiments of the inventive concept. Referring to FIG. 1, FIG. 2 and FIG. 16, apart from a luma/chroma selector 210', a coding mode selector 240', an FTQ block 250', and a sign data hiding block 260', the structure and operations of the encoder 200' illustrated in FIG. 16 are substantially the same as those of the encoder 200 illustrated in FIG. 2.

The luma/chroma selector 210' may select either a luma component or a chroma component, which are included in an input frame, and may output a frame including the selected component as a current frame. The luma/chroma selector 210' may transmit a first mode selection signal (SEL-LC), which includes attribute information (e.g. the luma component and/or chroma component) of the current frame including the selected component, to the sign data hiding block 260'.

The coding mode selector 240' may transmit a second mode selection signal (SEL-II), which includes coding mode information (e.g. inter coding mode or intra coding mode) selected by the coding mode selector 240', to the sign data hiding block 260'. The FTQ block 250' may transmit a third mode selection signal (SEL-SIZE), which includes information about the size of a transform unit TU subjected to transform and quantization, to the sign data hiding block 260'.

The sign data hiding block 260' may perform sign data hiding in different modes based on the first mode selection signal SEL-LC, the second mode selection signal SEL-II, and/or the third mode selection signal SEL-SIZE. The structure and operations of the sign data hiding block 260' will be described in detail with reference to FIG. 17.

Figure 17:
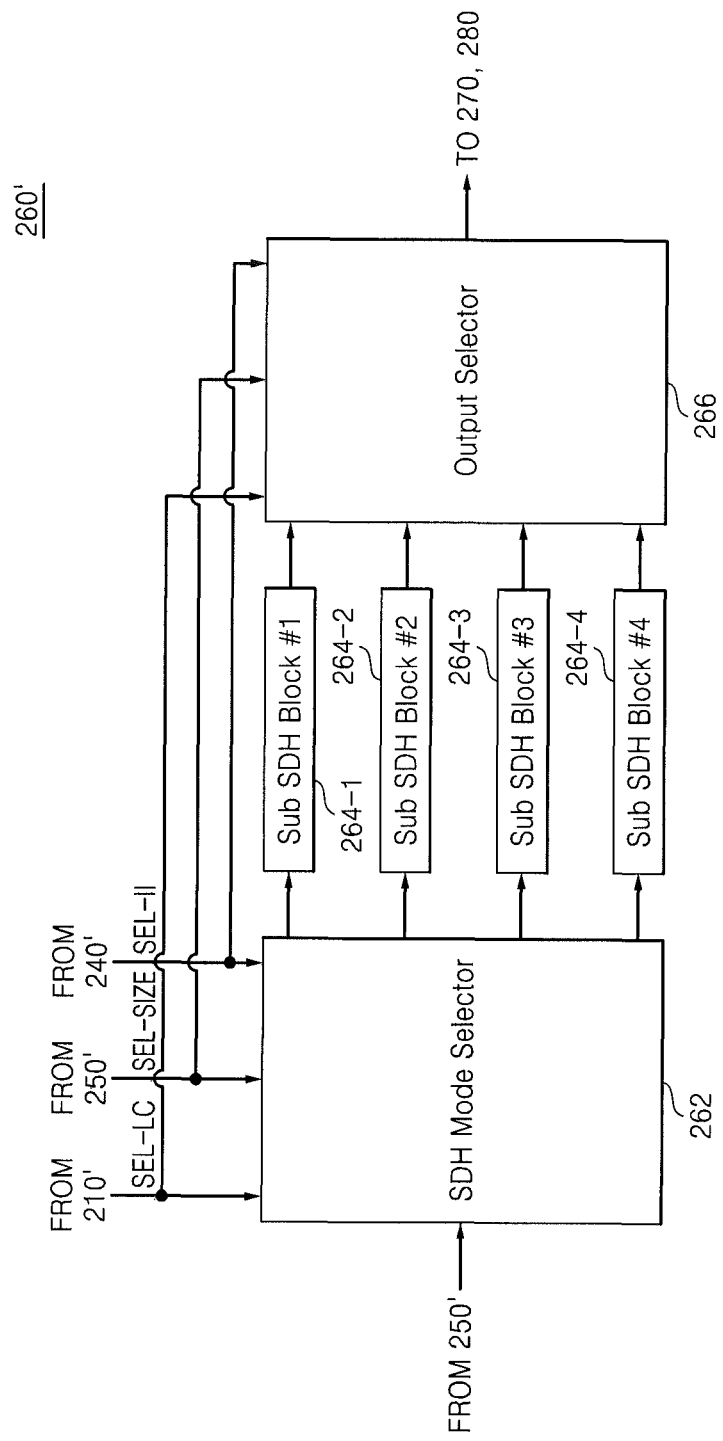
FIG. 17 is a block diagram of a sign data hiding block illustrated in FIG. 16.

FIG. 17 is a block diagram of the sign data hiding block 260' illustrated in FIG. 16. Referring to FIG. 16 and FIG. 17, the sign data hiding block 260' may include a sign data hiding (SDH) mode selector 262, a plurality of sub SDH blocks 264-1 through 264-4, and an output selector 266.

The SDH mode selector 262 may select a SDH mode based on the mode selection signals SEL-LC, SEL-SIZE and SEL-II. The SDH mode selector 262 may transmit a transform unit, which has been transformed and quantized by the FTQ block 250', to one of the sub SDH blocks 264-1 through 264-4 according to the selected SDH mode.

Each of the sub SDH blocks 264-1 through 264-4 may perform SDH based on a different adjustment target coefficient group.

The first sub SDH block 264-1 may perform SDH based on the adjustment target coefficient group ATCG1 or ATCG3 respectively illustrated in FIG. 7 or FIG. 11. The second sub SDH block 264-2 may perform SDH based on the adjustment target coefficient group ATCG2 or ATCG4 respectively illustrated in FIG. 9 or FIG. 13. The third sub SDH block 264-3 may perform SDH based on the adjustment target coefficient group ATCG5 illustrated in FIG. 15. The fourth sub SDH block 264-4 may perform SDH using the conventional method illustrated in FIG. 6. In other embodiments, each of the SDH blocks perform SDH using other combinations of Adjustment Target Coefficient Groups described herein.

The speed at which an SDH is performed is the highest in the first sub SDH block 264-1 and is progressively slower in the second through fourth sub SDH blocks 264-2 through 264-4 in order, so that the speed is the slowest in the fourth sub SDH block 264-4. Because the speed for the SDH is different among the sub SDH blocks 264-1 through 264-4, the SDH mode selector 262 may select the most appropriate block from among the sub SDH blocks 264-1 through 264-4 based on the mode selection signals SEL-LC, SEL-SIZE, and SEL-II.

In some embodiments, when the coding mode selected based on the second mode selection signal SEL-II is the inter coding mode, the SDH mode selector 262 may select the fourth sub SDH block 264-4. In other embodiments, when the coding mode selected based on the mode selection signals SEL-II, SEL-SIZE, and SEL-LC is the intra coding mode and a transform unit has a size of 4×4 and a luma attribute, the SDH mode selector 262 may select the first sub SDH block 264-1.

In further embodiments, when the coding mode selected based on the mode selection signals SEL-II, SEL-SIZE and SEL-LC is the intra coding mode and a transform unit has a size of 8×8 or 16×16 and a luma attribute, the SDH mode selector 262 may select the second sub SDH block 264-2. In other embodiments, when the coding mode selected based on the mode selection signals SEL-II, SEL-SIZE, and SEL-LC is the intra coding mode and the other conditions do not agree with either of the first and second sub SDH blocks 264-1 and 264-2, the SDH mode selector 262 may select the third sub SDH block 264-3.

The output selector 266 may transmit an output of one of the sub SDH blocks 264-1 through 264-4 to the entropy coder 270 and the IQT block 280 based on the mode selection signals SEL-LC, SEL-SIZE, and SEL-II.

The sign data hiding block 260' illustrated in FIG. 17 describes one example and may be modified in various ways. For instance, the SDH mode selector 262 may select an SDH mode using one or two of the mode selection signals SEL-LC, SEL-SIZE, and SEL-II. In other embodiments, the numbers and combinations of the sub SDH blocks 264-1 through 264-4 are varied according to design specifications.

Figure 18:
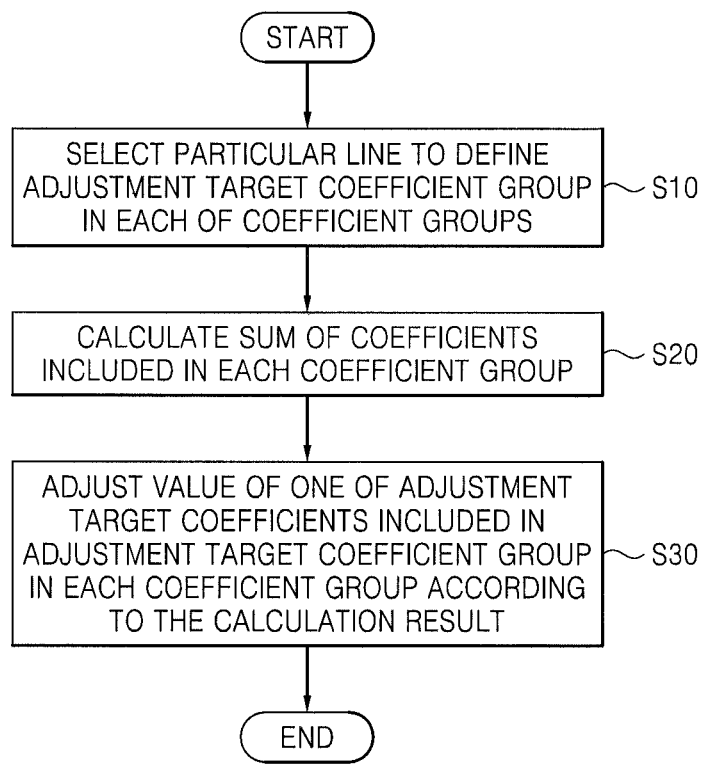
FIG. 18 is a flowchart of a data encoding method according to some embodiments of the inventive concept.

FIG. 18 is a flowchart of a data encoding method according to some embodiments of the inventive concept. Referring to FIG. 2, FIG. 7, FIG. 9, FIG. 11, FIG. 13, FIG. 15 and FIG. 18, the sign data hiding block 260 or 260' may select a particular line (e.g. a row or a column) to define the adjustment target coefficient group ACGa, ACGb, ACGc, ACGd, or ACGe in each of the coefficient groups CGa through CGp included in a transform unit TU in operation S10. Subsequently, the sign data hiding block 260 or 260' may select the particular line for each transform unit, as shown in FIG. 7, FIG. 9, FIG. 11 or FIG. 13, in response to the mode selection signals SEL-LC, SEL-SIZE, and SEL-II.

The sign data hiding block 260 or 260' calculates the sum of coefficients included in each of the coefficient groups CGa through CGp in operation S20. The sign data hiding block 260 or 260' may increase or decrease by one the value of one of adjustment target coefficients included in the adjustment target coefficient group defined in each of the coefficient groups CGa through CGp according to the calculation result in operation S30.

According to embodiments, the sign data hiding block 260 may search all of the coefficients CV included in the adjustment target coefficient group ATCG1 to ATCG5 in each of the coefficient groups CG for adjustment targets and may select one of the coefficients CV according to the search result.

As described above, according to some embodiments of the inventive concept, sign data hiding is performed so that one of coefficients included in a adjustment target coefficient group predetermined in each of coefficient groups is adjusted based on the sum of coefficients in each coefficient group and a scan operation for the last non-zero coefficient is not performed, thereby reducing hardware overhead. In addition, optimal sign data hiding is used based on information about the attribute of an image or image data, coding mode, and/or the size of a transform unit, so that the quality of the image or the image data is enhanced and a processing speed is maintained appropriately.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A method of encoding data comprising:
    selecting a line, with a sign data hiding block, to define an adjustment target coefficient group in each of a plurality of coefficient groups included in a transform unit that has been transformed and quantized by a forward transform and quantization (FTQ) block, each of the coefficient groups comprising a plurality of coefficients spatially arranged in a plurality of rows and columns, the line being a same one of the rows or a same one of the columns in each coefficient group, the sign data hiding block including a mode selector to select one of a plurality of sub sign data hiding blocks in response to a selection from the FTQ block;
    calculating, with the sign data hiding block, for each of the coefficient groups, a sum of the coefficients for the respective coefficient group, while concurrently performing an inverse-quantization and inverse-transformation of the coefficients not included in the line; and
    adjusting, with the sign data hiding block, for each of the coefficient groups, a value of one adjustment target coefficient included in the adjustment target coefficient group according to a result of the calculation of the sum of the coefficients for the respective coefficient group, wherein adjusting the value is performed without scanning for a last non-zero coefficient comprised in the transform unit.

2. The method of claim 1, wherein the line is a column at a same position amongst a plurality of columns in each of the coefficient groups.

3. The method of claim 2, wherein the column is one of a rightmost or a leftmost column.

4. The method of claim 1, wherein the line is a row at a same position amongst a plurality of rows in each of the coefficient groups.

5. The method of claim 4, wherein the row is one of a topmost or a bottommost row.

6. The method of claim 1, wherein adjusting the value of one of the adjustment target coefficients comprises increasing or decreasing the value, with the sign data hiding block by one when the sum of the coefficients is an even number and a sign of a first non-zero coefficient is a minus sign, or when the sum of the coefficient is an odd number and the sign of the first non-zero coefficient is a plus sign.

7. The method of claim 1 wherein selecting a line further comprises selecting at least one second line to define the adjustment target coefficient group in each of the coefficient groups.

8. The method of claim 1, wherein selecting the line is based on at least one mode selection signal.

9. An encoder comprising:
    a forward transform and quantization (FTQ) block configured to transform and quantize a transform unit;
    a sign data hiding block configured to select a line to define an adjustment target coefficient group in each of a plurality of coefficient groups comprised in the transform unit that has been transformed and quantized, the sign data hiding block including a mode selector to select one of a plurality of sub sign data hiding blocks in response to a selection from the FTQ block, each of the coefficient groups comprising a plurality of coefficients spatially arranged in a plurality of rows and columns, the line being a same one of the rows or a same one of the columns in each coefficient group, the sign data hiding block further configured to calculate a sum of the coefficients comprised in each of the coefficient groups, and for each of the coefficient groups, to adjust a value of an adjustment target coefficient comprised in the adjustment target coefficient group according to a result of a calculation of the sum of the coefficients for the respective coefficient group; and an inverse-quantization and inverse-transform block configured to perform an inverse-quantization and inverse-transformation of the coefficients, not included in the line, concurrently with the calculation of the sum by the sign data handing block.

10. The encoder of claim 9, wherein the line is a column at a same position in the coefficient groups amongst a plurality of columns in each of the coefficient groups.

11. The encoder of claim 10, wherein the column is one of a rightmost or a leftmost column.

12. The encoder of claim 9, wherein the line is a row at a same position amongst a plurality of rows in each of the coefficient groups.

13. The encoder of claim 12, wherein the row is one of a topmost or a bottommost row.

14. The encoder of claim 9, wherein the sign data hiding block increases or decreases the value of one of the adjustment target coefficients by one when the sum of the coefficients is an even number and a sign of a first non-zero coefficient has a minus sign, or when the sum of the coefficient is an odd number and the sign of the first non-zero coefficient has a plus sign.

15. The encoder of claim 9, wherein the sign data hiding block comprises:
- a sign data hiding mode selector configured to select a sign data hiding mode based on at least one mode selection signal;
- a plurality of sub sign data hiding blocks each configured to select, for each of the coefficient groups, one adjustment target coefficient comprised in the adjustment target coefficient group corresponding to the selected sign data hiding mode and to adjust the value of the adjustment target coefficient; and
- an output selector configured to output one output of the sub sign data hiding blocks based on at least one mode selection signal.

16. The encoder of claim 15, wherein the mode selection signals comprise attribute information of the transform unit, coding mode information of the transform unit, and size information of the transform unit;
- the attribute information comprising at least one of a luma component and a chroma component; and
- a coding mode information comprising information about one of an inter coding mode and an intra coding mode.

17. A system on chip (SoC) comprising:
a multimedia interface configured to interface frame data received from a multimedia device; and
an encoder configured to encode the frame data,
wherein the encoder comprises:
a forward transform and quantization (FTQ) block configured to transform and quantize a transform unit; and
a sign data hiding block configured to select a line to define an adjustment target coefficient group in each of a plurality of coefficient groups comprised in the transform unit that has been transformed and quantized, the sign data hiding block including a mode selector to select one of a plurality of sub sign data hiding blocks in response to a selection from the FTQ block, each of the coefficient groups comprising a plurality of coefficients spatially arranged in a plurality of rows and columns, the line being a same one of the rows or a same one of the columns in each coefficient group, the sign data hiding block further configured to calculate a calculation of a sum of the coefficients comprised in each of the coefficient groups, and for each of the coefficient groups, to adjust a value of one adjustment target coefficient comprised in the adjustment target coefficient group according to a result of the calculation of the sum of the coefficients for the respective coefficient group; and
an inverse-quantization and inverse-transform block configured to perform an inverse-quantization and inverse-transformation of the coefficients, not included in the line, concurrently with the calculation of the sum by the sign data handing block.

18. The system of claim 17, wherein the line is a column at a same position in the coefficient groups amongst a plurality of columns comprised in each of the coefficient groups, or a row at the same position in the coefficient groups amongst a plurality of rows comprised in each of the coefficient groups.

19. The system of claim 17, wherein the sign data hiding block increases or decreases the value of one of the adjustment target coefficients by one when the sum of the coefficients is an even number and a sign of a first non-zero coefficient has a minus sign, or when the sum of the coefficient is an odd number and the sign of the first non-zero coefficient has a plus sign.

* * * * *